United States Patent [19]

Fleisher et al.

[11] Patent Number: 4,639,769

[45] Date of Patent: Jan. 27, 1987

[54] MODIFYING COLOR DIGITAL IMAGES

[75] Inventors: Richard B. Fleisher, Pittsford; Bruce A. Rubin, Rochester, both of N.Y.

[73] Assignee: Eastman Kodak Company, Rochester, N.Y.

[21] Appl. No.: 718,317

[22] Filed: Apr. 1, 1985

[51] Int. Cl.⁴ .............................................. H04N 9/73
[52] U.S. Cl. ...................................... 358/27; 358/22; 358/37
[58] Field of Search ................. 358/21 R, 22, 27, 160, 358/93, 166, 37, 167, 36

[56] References Cited

U.S. PATENT DOCUMENTS 3,979,555  9/1976  Opittek et al. ................. 178/6.8
4,365,304  12/1982  Ruhman et al. ................. 364/515

Primary Examiner—Michael A. Masinick
Attorney, Agent, or Firm—Raymond L. Owens

[57] ABSTRACT

Apparatus and method are disclosed for modifying the brightness levels of three color digital images to make them compatible with an output display device which has a fewer number of available brightness levels for each color than the color digital images. Color histograms are produced for each color digital image. Each histogram is used for producing a transform function which operates on one of the color digital images to perform the following modification: a predetermined number of the digital pixels having the darkest brightness levels are assigned to the darkest brightness level of the output display device and a predetermined number of the digital pixels having the brightest brightness levels are assigned to the brightest level of the output device. The remaining pixels of the color digital image are assigned to their corresponding remaining output levels of the display device.

3 Claims, 4 Drawing Figures

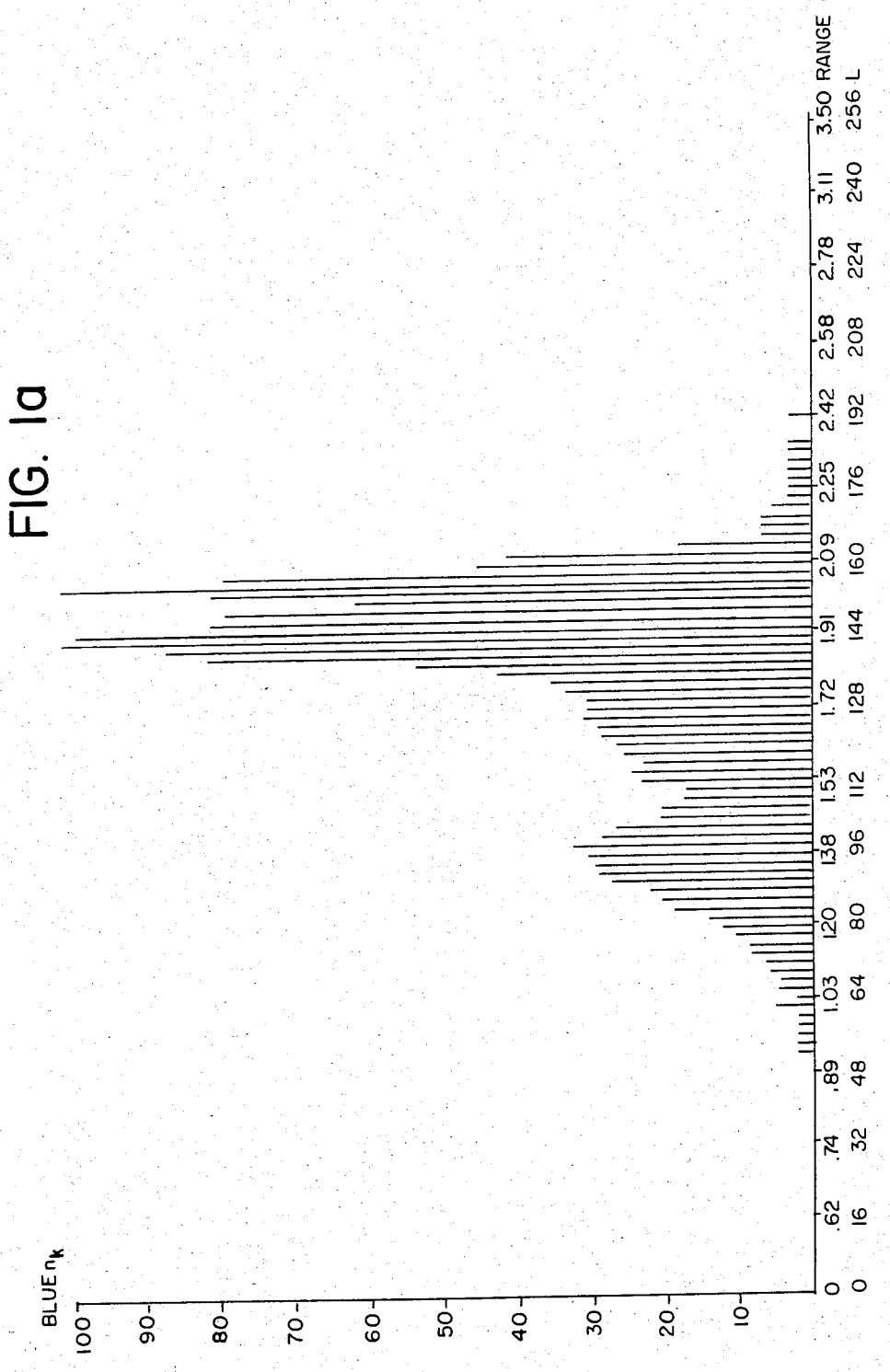

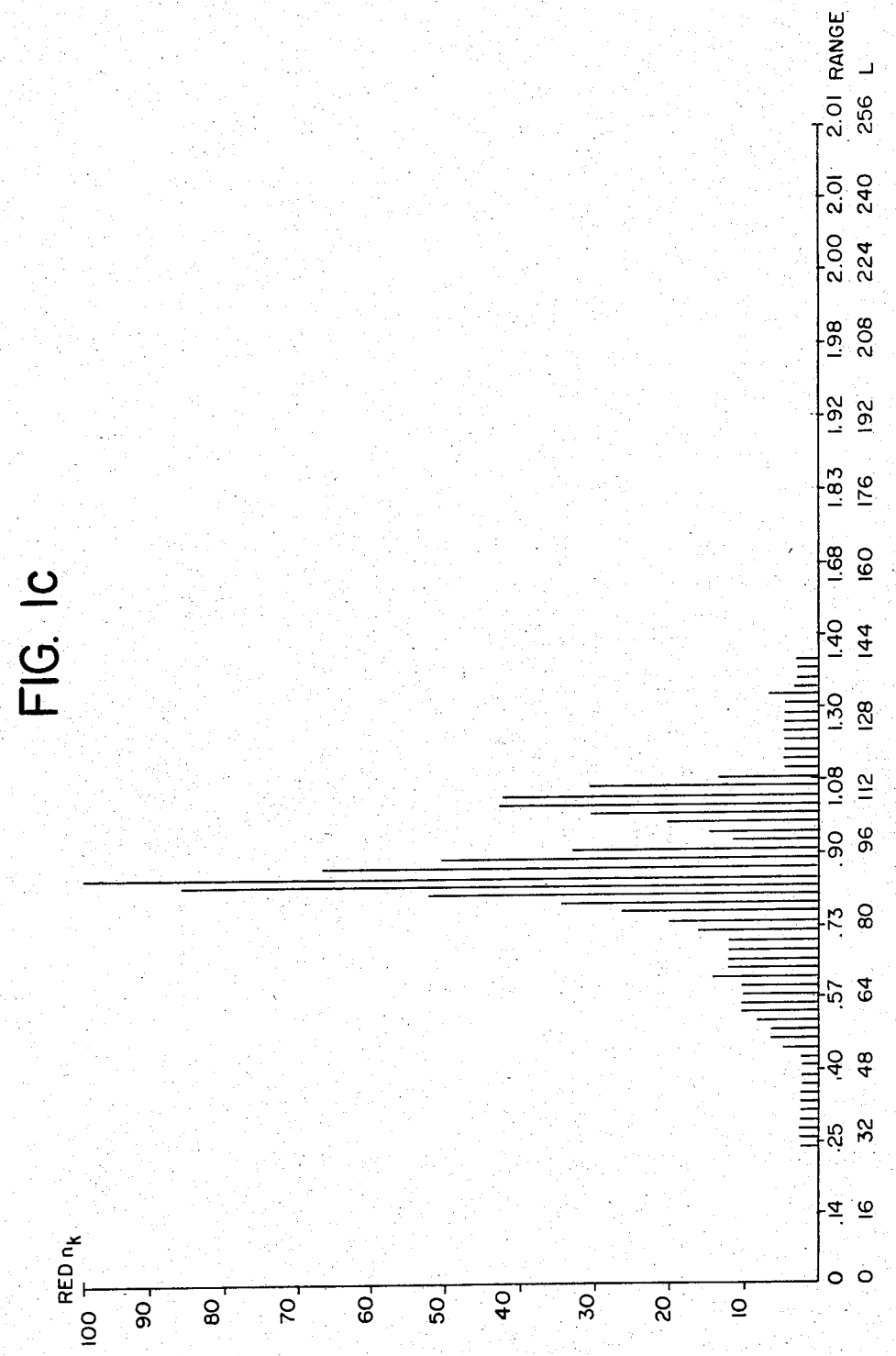

4,639,769

MODIFYING COLOR DIGITAL IMAGES

FIELD OF THE INVENTION

This invention relates to apparatus and method for modifying the brightness levels of color digital images to make them compatible with output display devices.

BACKGROUND OF THE INVENTION

A "color" digital image processing system typically includes a digitizer, an image processing system, and an output display device. The digitizer samples a color image and produces three separate color digital images. The colors are usually red, green and blue. Other colors can be used. Also, different visible regions of the electromagnetic spectrum can be used such as IR and UV. When the color digital images are combined, they should correspond to the original color image. The image processing system operates upon the color digital images using a variety of well known image enhancing techniques. The enhanced color digital images then are applied on a pixel-by-pixel basis to an output display device. Examples of output display devices are printers such as laser output printers and CRT systems. In CRT systems which display color images, the digital pixels of each color digital image are converted to analog signals (e.g. red, green and blue), each of which controls its own electron beam gun. Each gun has the usual function of producing a beam of electrons. Each beam excites a different color phosphor in the screen of a CRT. With all three guns operating, the screen of the CRT produces red, green and blue colors and their color mixtures.

Frequently, the color digital image pixels have many more discrete brightness levels than the corresponding brightness levels of the output display device. If the pixels of a color digital image are transformed into the corresponding output levels of the display device, the resulting output is generally of unsatisfactory quality. A number of techniques have been used with varying degrees of success, to modify the brightness levels of the color digital images to make them compatible with the available brightness levels of an output device. For example, U.S. Pat. No. 3,979,555 issued Sept. 7, 1976 to Opittek et al discloses a histogram equalization method. The equalized histogram of a digital image is substantially flat across its entire range. In other words, each brightness level contains about the same number of pixels as every other brightness level. Histogram equalization methods are quite effective for monochrome images. When they are used to transform the brightness levels of color digital images, they have not produced satisfactory quality color output images.

SUMMARY OF THE INVENTION

The object of this invention is to effectively transform color digital images to make them compatible with output display devices, especially those which have fewer available brightness levels for each color.

This object is achieved by apparatus which includes means responsive to the color digital images for forming three separate color histograms. Means respond to each of these color histograms for producing a transform function that operates on its color digital image pixels to modify their brightness levels so that a predetermined number of the brightest and darkest pixels are respectively assigned to the brightest and darkest levels of an output display device, and the remaining digital image pixels are assigned to their corresponding remaining output display device brightness levels whereby an improved output image is produced by the display device.

BRIEF DESCRIPTION OF THE DRAWINGS

FIGS. 1a, 1b and 1c are three color histograms of blue, green and red color digital images of a color image.

DESCRIPTION OF THE PREFERRED EMBODIMENTS

Figure 2:
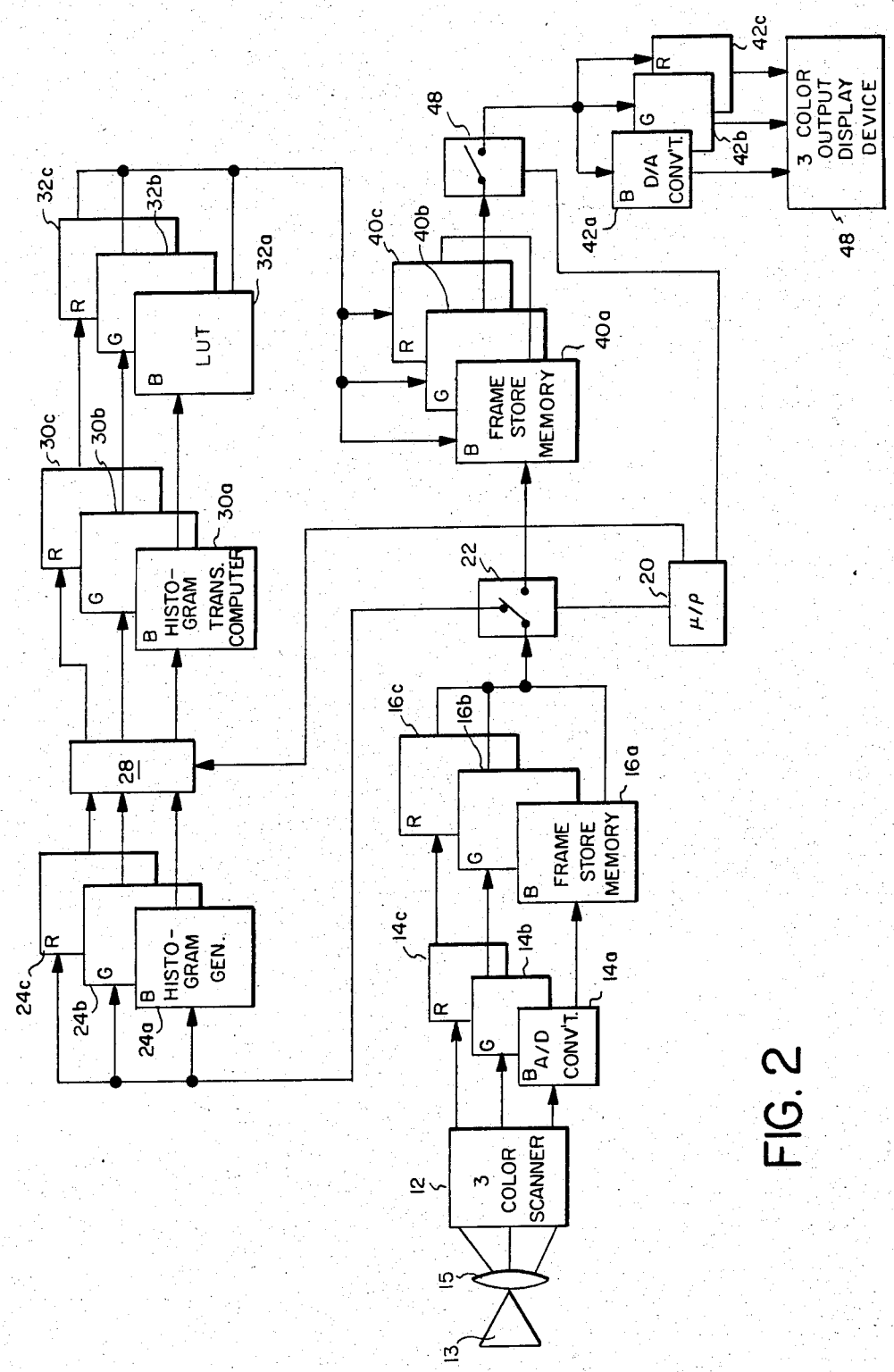
FIG. 2 is a schematic block diagram of apparatus in accordance with the present invention.

Turning now to FIG. 2, apparatus 10 in accordance with the present invention includes a three-color scanner 12 which samples a color original 13 through a lens 15. The scanner 12 may take many forms known in the art such as photoconductive devices, photodiodes and phototransistors. It may also include three separate area image sensors. In any case, the scanner 12 provides three analog signals each of which represents discrete brightness levels of pixels of a color of the color original. These analog signals are respectively delivered to analog-to-digital converters 14a, 14b and 14c. Analog-to-digital converter 14a provides an input into a frame store memory 16a which stores a digital image of the blue color "B" of the color original. Frame store memory 16b stores a digital image of the green color "G" of the color original and frame store memory 16c stores a digital image of the red color "R" of the color original. Although not shown, it will be understood that apparatus 10 can also include a digital image processor for enhancing each of these color digital images.

A microprocessor 20 is shown schematically to operate a switch 22. In its upper-most position, switch 22 provides a communication link between corresponding ones of frame store memories 16a, 16b and 16c and histogram generators 24a, 24b and 24c. The histogram generators 24a, 24b and 24c respectively produce histograms of the digital images stored in the frame store memories 16a, 16b and 16c. The construction of such histograms is a technique well understood in the art and is disclosed in U.S. Pat. No. 3,979,555 for example. After the histograms are produced, microprocessor 20 provides an input signal to a control block 28 which couples the histogram generators 24a, 24b and 24c, with their corresponding histogram transform function computers 30a, 30b and 30c. The histogram transform computers produce transform functions. After these functions are produced they are stored in lookup tables 32a, 32b and 32c respectively. These functions are made available to logic in the blocks labeled frame store memories 40a, 40b and 40c and are used to modify the brightness levels in memories 16a, 16b and 16c. The microprocessor 20 thereafter actuates the switch 22 to couple each of the frame store memories 16a, 16b, and 16c into their respective frame store memories 40a, 40b and 40c.

The transform functions provide the information necessary to modify the brightness levels of the digital color images to make them compatible with the available brightness levels of a display device 46. The modified color digital images are stored in memory planes in frame store memories 40a, 40b and 40c respectively. The microprocessor 20 controls another switch 48 which couples on a pixel-by-pixel basis memory locations of the memory planes of the frame store memories 40a, 40b and 40c into digital-to-analog converters 42a, 42b, and 42c respectively. The analog signals are sequentially delivered to the three colored output display device 46. The output display device produces an image which is directly controlled by the brightness levels of each modified color pixel stored in the memory locations of the memory planes of memories 40a, 40b and 40c.

At the beginning of any scanning cycle, the frame store memories 16a, 16b and 16c and 40a, 40b and 40c are cleared (set to zero). Let us assume that each frame store memory 16 contains an equal number of n pixel locations. Each of the n pixel locations in each of the frame store memories 16a, 16b and 16c receives a digital signal representative of one of L possible brightness levels. When all n memory locations are filled, a color digital image is formed. The microprocessor 20 then connects the histogram generators 24a, 24b and 24c to their corresponding frame store memories 16a, 16b and 16c. Each of these generators 24 includes sufficient memory space to form a color histogram. Each histogram generator includes L histogram memory locations [from location "o" to location (L-1)] representative of digital image brightness levels. In each of the L memory locations, a number $n_L$ is stored which represents the number of pixels in the color digital image having a particular brightness level.

The operation of the computer 30 and the process it uses to produce the transform functions will now be described. Each transform computer 30 adds the contents of memory location starting with first histogram memory location "o" and proceeds through the successive histogram memory locations until the sum of pixels equals or exceeds a first predetermined number. All of these pixels are to be assigned to the brightest brightness level of the output device. Then each computer starting at histogram memory location (L-1) performs a similar operation in reverse direction until the sum of pixels at the memory location equals or exceeds a second predetermined number. All of these pixels will be assigned to the darkest brightness level of the output display device. Next the computer subtracts the computed dark level from the light level. This is the dynamic range of the input signal. The computer then divides this dynamic range of the histogram between these two points by the number (K-2), where K is the number of brightness levels of the output device. The generators 30 delivers these numbers which provide the transform functions to the lookup tables 32. The transform function in each lookup table maps the L brightness levels of its color digital image into K brightness levels of the output device, where L>K.

An example of an output device would be the Grinnell Graphics Television Display System (Model GMR-27) which can produce a 256 pixel×256 pixel array output image. In this case, n is equal to approximately 62,500 (256×256). Each output image pixel has three colors; red, green and blue. Each color has 16 available brightness levels (K). Each one of these K levels controls an electron beam in the cathode ray tube of the television display device in the usual manner.

We will now discuss a specific example where color digital images were displayed on Grinnell Model GMR-27. In Table I and FIG. 1c of the drawings, a histogram of a red color digital image representing an array of 62,500 pixels is depicted. Each pixel can have one of 256 brightness levels. L is of course equal to 256. As shown in FIG. 1c for example, the red brightness levels correspond to a brightness range of from 0–2.01.

Figure 1B:
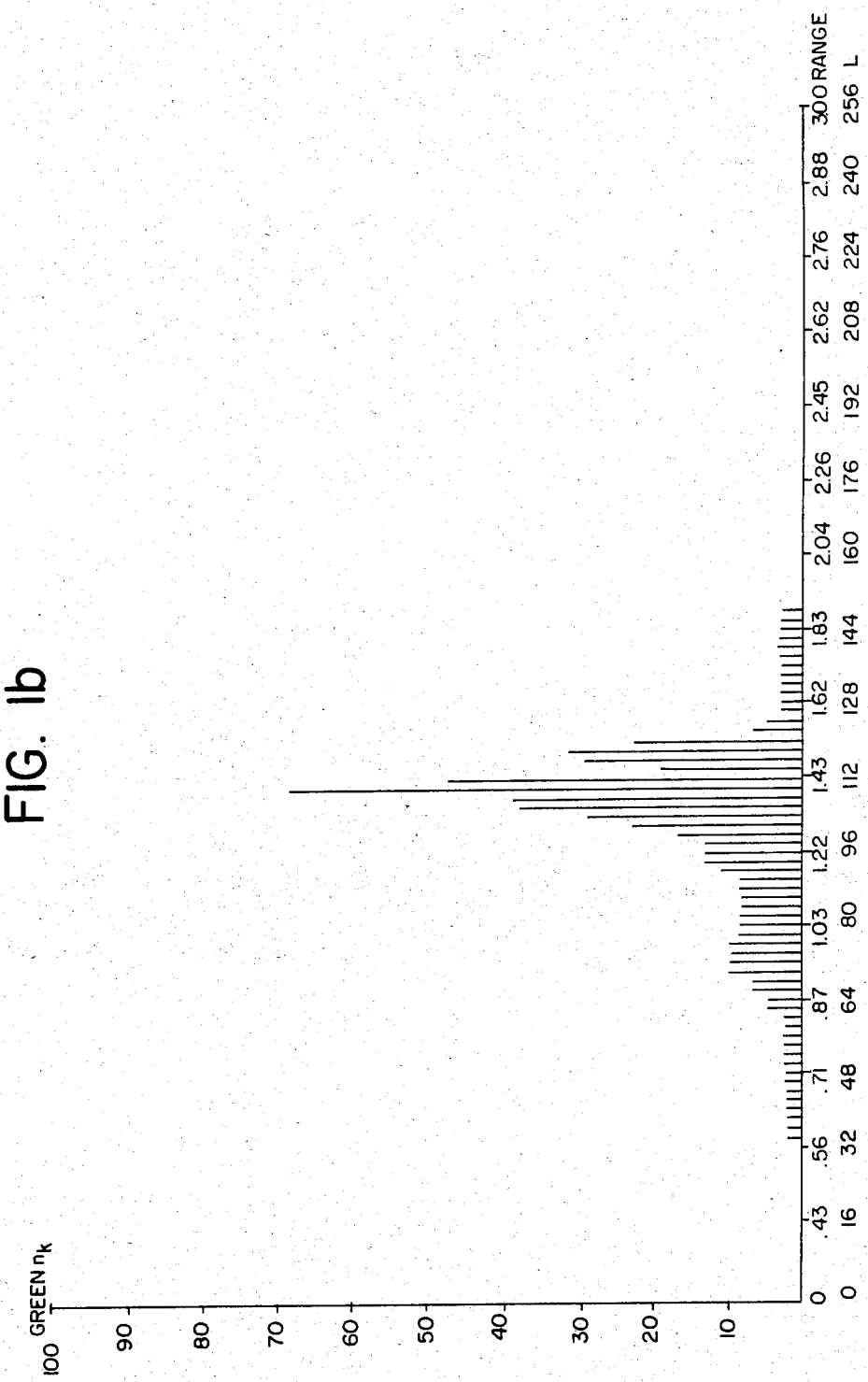

A plot of $n_K$ vs density range or L is a histogram. The histograms of FIGS. 1a, 1b, and 1c are approximations to color image probability density functions. As the number of levels L increases, the approximation becomes more accurate and the digital image is a better representation of the color image. A histogram of a particular color thus shows how many pixels of a color occur at each brightness level. As shown in Table I, the red color digital image does not make use of all available brightness levels L (pixels are formed only in the range of 0.23 to 1.37) and if the pixels were directly scaled into the sixteen levels needed to operate the output display CRT device, many of these sixteen levels would have no information content. In accordance with the invention, we will assume that a predetermined number of the digital image pixels represents the brightest information in the scene. This number can be determined experimentally for different display devices. We have found that for Model GMR-27, this predetermined number should be about 2097 pixels. The same predetermined number of pixels was used to represent both the darkest and brightest information in the scene. Both of these numbers are about 3.2% of the total population of n pixels. It will be understood that these two numbers do not necessarily have to be the same. The remaining dynamic range was divided into (K-2) or fourteen equal-brightness-range increments. Each increment is

TABLE I

| (Using Density Range Scale) | | |
|---|---|---|
| | Absolute min/max | 3.2% Points |
| FIG. 1a (Blue) | | |
| Min density | 0.93 | 1.20 |
| Max density | 2.42 | 2.10 |
| FIG. 1b (Green) | | |
| Min density | 0.57 | 0.88 |
| Max density | 1.89 | 1.54 |
| FIG. 1c (Red) | | |
| Min density | 0.23 | 0.51 |
| Max density | 1.37 | 1.12 | or about 0.04 density range. So for example all pixels with a density of 0.51 or less will be assigned to the brightest brightness level for red of the output display device. Those with a density range of 1.12 or greater will be assigned to the darkest brightness level for the red of the output display device. Those with a density range between 0.55 and 0.52 will be assigned to the next darkest level and so forth. In a similar manner, the remaining red pixels are assigned to their corresponding remaining device brightness levels. This process was repeated for each color digital image. Using this process, excellent output images were produced on Model GMR-27.

TABLE I

| (Using Density Range Scale) | | |
|---|---|---|
| | Absolute min/max | 3.2% Points |
| FIG. 1a (Blue) | | |
| Min density | 0.93 | 1.20 |
| Max density | 2.42 | 2.10 |
| FIG. 1b (Green) | | |
| Min density | 0.57 | 0.88 |
| Max density | 1.89 | 1.54 |
| FIG. 1c (Red) | | |
| Min density | 0.23 | 0.51 |

TABLE I-continued (Using Density Range Scale)

| | Absolute min/max | 3.2% Points |
|---|---|---|
| Max density | 1.37 | 1.12 |

In accordance with this invention, tone scale compression or expansion can take place during the process. In the example shown, expansion takes place. Tone scale compression would occur with an original image having colors with a wide dynamic range, and would make visible on the device screen information which ordinarily would be lost. For example, when the original image is a photographic negative, it can have a wide dynamic range with substantial information in the shoulder or toe portions of its characteristic curve. Tone scale expansion of underexposed original images in accordance with this invention will often produce better results than with optical printing. An advantage of apparatus in accordance with the invention is that it can be used to provide image enhancement and image restoration.

We claim:

1. Apparatus for modifying the brightness levels of three digital color images which have a predetermined number of discrete brightness levels respectively to make them compatible with an output display device which has a number of available discrete brightness levels, comprising:
   (a) means responsive to the color digital images for forming three separate histograms; and
   (b) means responsive to each histogram for producing a transform function that operates upon its color digital image pixels to modify their brightness levels so that predetermined numbers of the brightest and darkest pixels are respectively assigned to the brightest and darkest level of the output display device and the remaining digital image pixels are assigned to their corresponding remaining output display device brightness levels, whereby an improved output image is produced by the display device.

2. A method for modifying the brightness levels of three color digital images to make them compatible with an output display device which has fewer number of available brightness levels for each color than the color digital images comprising:
   (a) producing three color histograms from the color digital images respectively; and
   (b) producing three transformation functions in response to the three color histograms which respectively operate on their three color digital images to transform their brightness levels into levels compatible with the output device brightness levels wherein each said transformation function assigns a predetermined number of the brightest pixels of a color digital image to the brightest level of the output display device and a predetermined number of the darkest pixels of a color digital image to the darkest output display level and transfers the remaining pixels to their corresponding remaining device brightness levels.

3. A method of modifying the brightness levels of a color digital image having n pixels with L discrete possible brightness levels which cover a first range of brightnesses to match a display device having K discrete brightness levels which cover a second range of brightness, where $L > K$, comprising the steps of:
   (a) constructing a histogram of the color digital image;
   (b) selecting from the histogram (i) a predetermined number of the darkest brightness level digital pixels which correspond to a first portion of the first range and assigning them to the darkest level of the output display device and (ii) a predetermined number of the brightest level digital pixels which correspond to a second portion of the first range and assigning them to the brightest brightness level of the output display device;
   (c) assigning each of the remaining digital pixels to their closest output display brightness level.

* * * * *